June 11, 1929.                C. A. ROSSBERG                1,716,385
NUT LOCK
Filed April 3, 1928
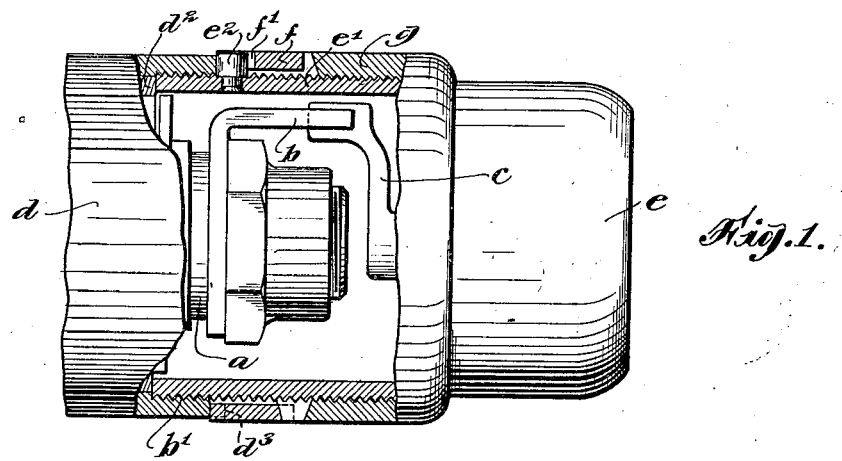
Fig.1.
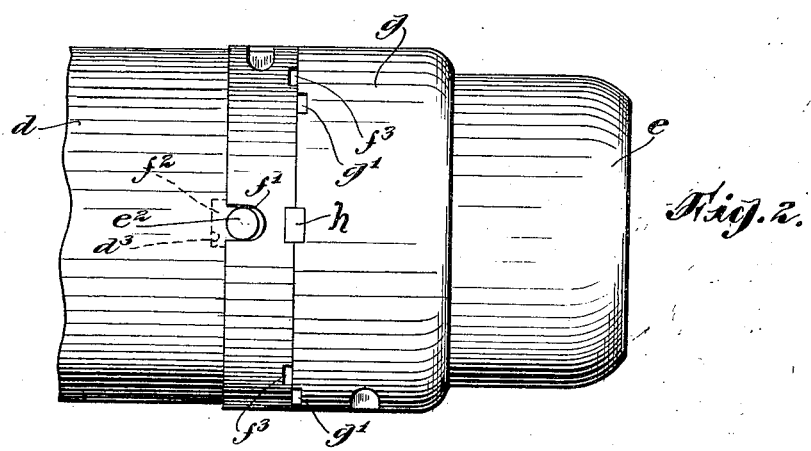
Fig.2.
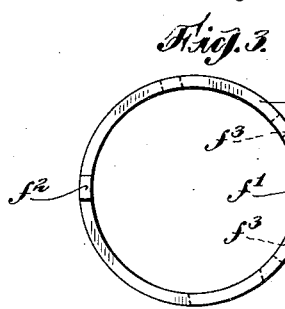
Fig.3.  Fig.4.
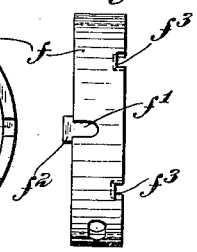
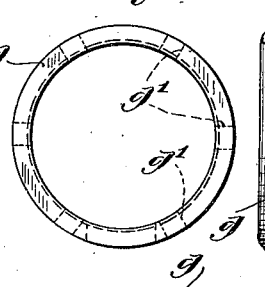
Fig.5.
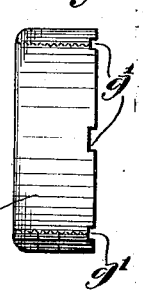
Fig.6.
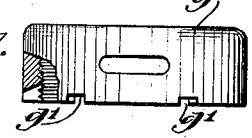
Fig.7.
INVENTOR
Charles A. Rossberg
BY
Redding, Greeley, O'Shea & Campbell
ATTORNEYS Patented June 11, 1929.

1,716,385

UNITED STATES PATENT OFFICE.

CHARLES A. ROSSBERG, OF WEST HARTFORD, CONNECTICUT, ASSIGNOR TO VEEDER-ROOT INCORPORATED, OF HARTFORD, CONNECTICUT, A CORPORATION OF CONNECTICUT.

NUT LOCK.

Application filed April 3, 1928. Serial No. 267,084.

This invention is concerned particularly with the means for securing hubodometers in place on the hubs of vehicle wheels. Much difficulty has been experienced heretofore in retaining such odometers in position in the continued use of the vehicles to which they are applied. It is therefore the special object of this invention to provide means by which such an odometer shall be secured in position not only in such manner as to prevent undisclosed tampering with the odometer by an unauthorized person, but especially in such manner as to prevent unintentional displacement of the odometer in the continued use of the vehicle. It will be obvious, however, that the invention is capable of application to other structures similar to that shown whether in connection with wheel hubs and odometers or other specific devices. The invention will be more fully explained hereinafter with reference to the accompanying drawing in which it is illustrated and in which:

Figure 1 is a view in elevation, partly in longitudinal section showing a portion of a vehicle hub and the improved means for securing the odometer casing to the hub.

Figure 2 is a view of the same as seen from above in Figure 1.

Figures 3 and 4 are detail views in end elevation and side elevation, respectively, of the first ring of the locking device.

Figures 5 and 6 are similar views of the second locking ring.

Figure 7 is a view of the second locking ring as seen from below in Figure 6, this view being partly broken out to show details of construction.

In the embodiment of the invention shown in Figure 1, the axle $a$ of the vehicle is shown as having an arm $b$ for engagement with an arm $c$ which is in operative relation with the odometer mechanism, the odometer mechanism, of ordinary construction and not necessary to be described or shown herein, being actuated as usual through the rotation of the vehicle wheel while the arm $c$ is held from rotary movement by the stationary arm $b$.

The hub $d$ of the wheel or other cylindrical base member is shown as threaded internally, as at $b^1$, to receive the externally threaded portion $e^1$ of the cylindrical member to be secured to the base member, such as an odometer casing $e$, the odometer casing being screwed tightly into the base member against the roller bearing ring $d^2$ and thereby directly engaged with the base member. The threaded portion $e^1$ of the member $e$ has secured thereto, as by riveting, a stud $e^2$.

The first locking ring $f$ is not threaded internally but is adapted to be slipped upon the threaded portion $e^1$ of the member $e$ and at its inner edge, nearest the wheel, it is formed with a notch $f^1$ and a lug or tooth $f^2$ which is adapted to engage a notch $d^3$ formed in the edge of the base member $d$. When the member $e$, $e^1$ has been screwed tightly into position the ring $f$ is slipped into place with the notch $f^1$ in partial engagement with the stud $e^2$. The position of the lug $f^2$ is then marked on the edge of the member $d$, and, the ring and casing being removed, the notch $d^3$ is formed in the edge of the member $d$.

The ring $f$ has formed in its outer edge several notches $f^3$ for a purpose to be explained.

The second locking ring $g$ is threaded internally to engage the threaded portion $e^1$ of the member $e$ and is formed in its inner edge with several notches $g^1$, usually one more or one less in number than the notches $f^3$ in the ring $f$ and differentially distributed with respect to the notches $f^3$.

After the notch has been formed in the edge of the member $d$, as above explained, the member $e$ is screwed into the end of the hub tightly against the roller bearing ring, and the first ring $f$ is slipped into place with its notch $f^1$ in engagement with the stud $e^2$ of the member $e$, and with its lug $f^2$ in engagement with the notch $d^3$ in the edge of the member $d$, thus serving, while it is in place, to lock the member $e$ against rotation with respect to the member $d$ and to lock the first ring $f$ itself against rotation. The second ring $g$ is then screwed into place until one of the notches $g^1$ in the second ring $g$ registers or nearly registers with one of the notches $f^3$ in the ring $f$. It will be found that a very slight additional turning of the second ring will bring the two notches into registration. A lead seal $h$ is then driven into the two resigtering notches, thereby preventing the second ring from being backed off from the casing, which is held against rotation as already described. By this construction it becomes impossible for the casing to become displaced unintentionally and becomes impossible for anyone to tamper with the odometer without disclosing that fact by reason of the destruction of the lead seal.

I claim as my invention:

1. The combination of a cylindrical base member, a second cylindrical member having a threaded engagement with the base member, the base member having a notch in its edge and the second member having a projecting stud, a ring on the second member having a notch to engage said stud and a lug to engage the notch in the base member, a second ring threaded on the second member, and devices to prevent rotation of the second ring with respect to the first mentioned ring.

2. The combination of a cylindrical base member, a second cylindrical member having a threaded engagement with the base member, the base member having a notch in its edge and the second member having a projecting stud, a ring on the second member having a notch to engage said stud and a lug to engage the notch in the base member, and a second ring threaded on the second member, the adjacent edges of the first mentioned ring and the second ring being notched to receive a seal.

This specification signed this 30th day of March A. D. 1928.

CHARLES A. ROSSBERG.